United States Patent
Liu et al.

(10) Patent No.: US 7,422,620 B2
(45) Date of Patent: Sep. 9, 2008

(54) PROCESS FOR PRODUCING COPPER NANOPARTICLES

(75) Inventors: Weimin Liu, Gansu (CN); Xiaobo Wang, Gansu (CN); Singgou Fu, Gansu (CN)

(73) Assignee: Lanzhou Institute of of Chemical Physics, Lanzhou, Gansu (CN)

( * ) Notice: Subject to any disclaimer, the term of this patent is extended or adjusted under 35 U.S.C. 154(b) by 541 days.

(21) Appl. No.: 10/997,220

(22) Filed: Nov. 23, 2004

(65) Prior Publication Data

US 2006/0053972 A1 Mar. 16, 2006

(51) Int. Cl.
B22F 9/24 (2006.01)

(52) U.S. Cl. .................................. 75/373; 977/896
(58) Field of Classification Search ............... 75/373; 977/896

See application file for complete search history.

(56) References Cited

U.S. PATENT DOCUMENTS

| 6,262,129 | B1 * | 7/2001 | Murray et al. ............... 516/33 |
| 2003/0051580 | A1 * | 3/2003 | Lewis et al. ................. 75/362 |
| 2003/0199653 | A1 * | 10/2003 | McCormick et al. ..... 526/219.6 |

FOREIGN PATENT DOCUMENTS

CN 2004100494489 6/2004

OTHER PUBLICATIONS

M.P. Pileni; T. Gulik Krzywicki; J. Tanori; A Filankembo and J.C. Dedieu, Template Design of Microreactors with Colloidal Assemblies: Control the Growth of Copper Method Rods, Article, 5 page(s), © 1998 American Chemical Society.

N. Arul Dhas; C. Paul Raj and A. Gedanken, Synthesis, Characterization, and Properties of Metallic Copper Nanoparticles, Article, 7 page(s), © 1998 American Chemical Society.

Joanna P. Cason; Michael E. Miller; Jason B. Thompson and Christopher B. Roberts, Solvent Effects on Copper Nanoparticle Growth Behavior in AOT Reverse Micelle Systems, Article, 6 page(s), © 2001 American Chemical Society.

(Continued)

*Primary Examiner*—George Wyszomierski
(74) *Attorney, Agent, or Firm*—Greenberg Traurig, LLP

(57) ABSTRACT

The present invention provides a process for producing copper nanoparticles, comprising steps of: a) reacting an aqueous solution containing a reductant with an aqueous solution of a copper salt while stirring for 1-8 min, wherein the reductant being one or more selected from a group consisting of hydrazine hydrate, sodium borohydride and sodium hypophosphite; b) adding an apolar organic solution containing the extracting agent and continuing the stirring for 0.5-1.5 hrs, said extracting agent being one or more selected from the group consisting of alkyl dithiocarbonic acid and salts thereof, O,O'-dialkyl dithiophosphoric acid and salts thereof, and dialkylamino dithioformic acid and salts and said apolar organic solution being one selected from the group consisting of benzene, toluene and straight or branched alkanes having 6-12 carbon atoms, wherein the alkyl having 6-20 carbon atoms; and c) post-treating the reaction product to obtain copper nanoparticles.

6 Claims, 1 Drawing Sheet

OTHER PUBLICATIONS

Tung-Yu Chen; Shin-Fu Chen; Hwo-Shuenn Sheu and Chen-Sheng Yeh, Reactivity of Laser-Prepared Copper Nanoparticles: Oxidation of Thiols to Disulfides, Article, 6 page(s), © 2002 American Chemical Society.

Joanna P. Cason and Christopher B. Roberts, Metallic Copper Nanoparticle Synthesis in AOT Reverse Micelles in Compressed Propane and Superficial Ethane Solutions, Article, 5 page(s), © 2000 American Chemical Society.

Arnim Henglein, Formation and Absorption Spectrum of Copper Nanoparticles from the Radiolytic Reduction of $Cu(Cn)_2$. 6 page(s), © 2000 American Chemical Society.

H.H. Huang; F. Q. Yan; Y.M. Kek; C.H. Chew; G.Q. Xu; W. Ji; P.S. Oh and S.H. Tang, Synthesis, Characterization, and Nonlinear Optical Properties of Copper Nanoparticles, 4 page(s), © 1997 American Chemical Society.

* cited by examiner

PROCESS FOR PRODUCING COPPER NANOPARTICLES

TECHNICAL FIELD OF THIS INVENTION

The present invention relates to a process for manufacturing copper nanoparticles, more particularly, to a process for manufacturing copper nanoparticles well dispersed in an organic system.

BACKGROUND OF THIS INVENTION

As an active soft metal nanometer grade particle, copper nanoparticles can be expected to use in the lubricant industry as a novel modified lubricant additive. The reasons lie in its sufficient stability and dispersity in a lubricant, and low production cost. At present, the pure copper nanoparticle powders are generally prepared by a vacuum vaporization coating method, sputtering method and other physical methods. It tends to degrade in air due to oxidization, tends to precipitate due to its poor dispersity in the solvent, and can not be suitably used in the lubricant industry. Some chemical methods for producing copper nanoparticles with low cost have been reported. For example, a chemically reducing method reported by H. H. Huang, F. Q. Yan, Y. M. Kek, C. H. Chew, G. Q. Xu, W. Ji, P. S. Oh, S. H. Tang. Synthesis, Characterization, and Nonlinear Optical Properties of Copper Nanoparticles, *Langmuir*, 1997, 13, 172; a radiation reducing method reported by A. Henglein, Formation and Absorption Spectrum of Copper Nanoparticles from the Radiolytic Reduction of $Cu(CN)_2$. *J. Phys. Chem. B*, 2000, 104, 1206; a reducing method in an atmosphere of supercritical fluid reported by J. P. Cason, C. B. Roberts, *J. Phys. Chem. B*, 2000, 104, 1217; a laser pulverization method reported by Tung-Yu Chen, Shin-Fu Chen, Hwo-Shuenn Sheu, Chen-Sheng Yeh, Reactivity of Laser-Prepared Copper Nanoparticles: Oxidation of Thiols to Disulfides, *J. Phys. Chem. B*, 2002, 106, 9717-9722; and a reverse micelle method reported by Joanna P. Cason, Michael E. Miller, Jason B. Thompson, and Christopher B. Roberts, Solvent Effects on Copper Nanoparticle Growth Behavior in AOT Reverse Micelle Systems, *J. Phys. Chem. B*, 2001, 105, 2297-2302. Moreover, Gedanken et al disclose a method for producing copper nanoparticles by the self-reduction of a precursor, see N. Arul Dhas, C. Paul Raj, A. Gedanken, Synthesis, Characterization, and Properties of Metallic Copper Nanoparticles, *Chem. Mater.*, 1998, 10, 1446-1452; and Pileni et al disclose a method for producing copper nanoparticles with various shapes by a surfactant-capsuling method, see M. P. Pileni, T. Gulik-Krzywicki, J. Tanori, A. Filankembo, J. C. Dedieu, Template Design of Microreactors with Colloidal Assemblies: Control the Growth of Copper Metal Rods, *Langmuir*, 1998, 14, 7359. Although these methods can be used to prepare the copper nanoparticles, they have the following disadvantages: being difficult to operate more or less and thus difficult to be commercialized; the resulting copper nanoparticles are unstable in air and thus can hardly be stably dispersed in a lubricant.

SUMMARY OF THIS INVENTION

The object of the present invention is to provide a method for producing copper nanoparticles with a higher stability, a higher dispersity in an organic medium, and a monodispersity.

The present invention provides a process for producing copper nanoparticles, comprising steps of:

a) reacting an aqueous solution containing a reductant with an aqueous solution of a copper salt while stirring for 1-8 min, wherein the reductant being one or more selected from a group consisting of hydrazine hydrate, sodium borohydride and sodium hypophosphite;
b) adding an apolar organic solution containing the extracting agent and continuing the stirring for 0.5-1.5 hrs, said extracting agent being one or more selected from the group consisting of alkyl dithiocarbonic acid and salts thereof, O,O'-dialkyl dithiophosphoric acid and salts thereof, and dialkylamino dithioformic acid and salts and said apolar organic solution being one selected from the group consisting of benzene, toluene and straight or branched alkanes having 6-12 carbon atoms, wherein the alkyl having 6-20 carbon atoms; and
c) post-treating the reaction product to obtain copper nanoparticles.

DETAILED DESCRIPTION OF THE INVENTION

Figure 1:
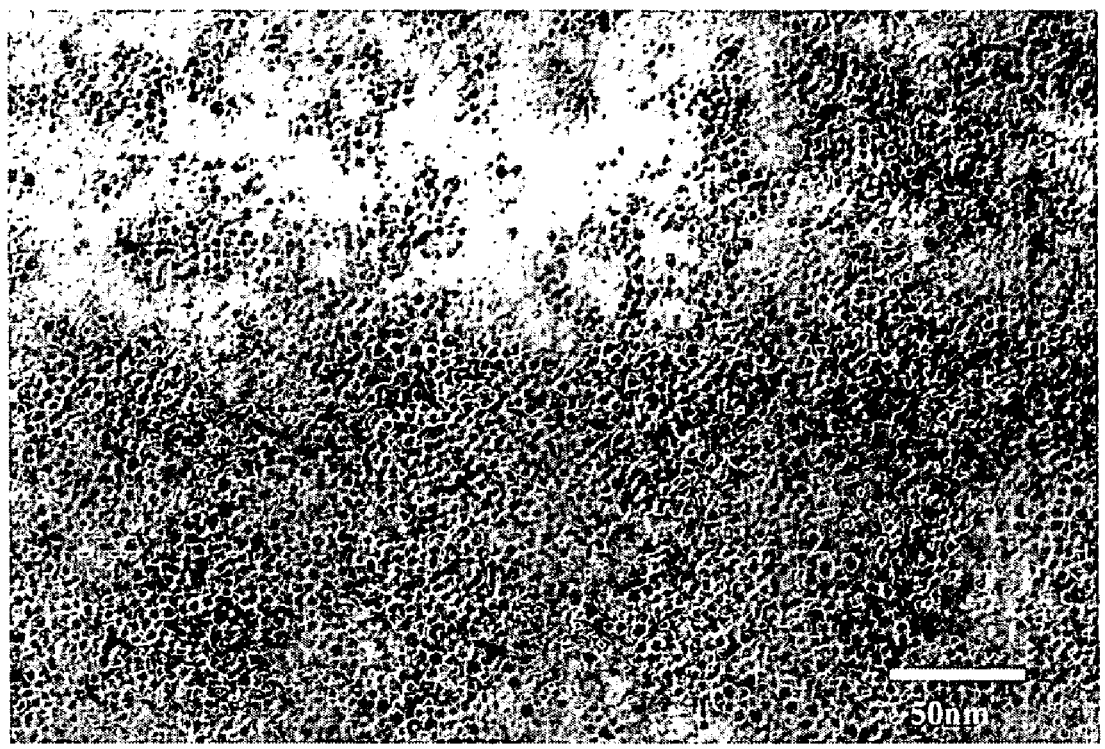
FIG. 1 shows a transmitted electron microscopic photograph of the copper nanoparticle obtained by using (O,O')-di-n-hexadecyl dithiophosphoric acid as an extracting agent. As can be seen, the particle diameter of the copper nanoparticle is about 2-4 nm.

For example, the present invention can be achieved by the following embodiments.

In order to solve the above technical problems, the present inventors have studied a simple process for preparing copper nanoparticles. In accordance with the present process, nanoparticles exhibiting good dispersity, stability and other application properties can be produced in large scale. The present process for preparing the copper nanoparticles is based on the basic principle of traditional mineral floatation and ion extraction, comprising the steps of: preparing the sol of the copper nanoparticles; extracting the copper nanoparticles into a nonpolar organic system inmiscible with water under the action of a suitable floatation agent or extracting agent; separating and concentrating the organic phase; and separating out the nanoparticles by changing the polarity of the organic phase. The extracting agent is adsorped on the surface of nanoparticles during the two-phase reaction and in the meantime modifies the surface of the nanoparticles. After the phase transfer and the phase separation, the resultant nanoparticles contain no inorganic and organic impurities, and thus have high purity.

The present invention provides a process for preparing the copper nanoparticles, characterized in the following steps: reacting an aqueous solution containing a reducing agent with an aqueous solution containing a copper salt for 1-8 min under stirring, said reducing agent being one selected from the group consisting of hydrazine hydrate, sodium borohydride and sodium hypophosphite; adding the apolar organic solution containing the extracting agent and continuing the stirring for 0.5-1.5 hrs, said extracting agent being one or more selected from the group consisting of alkyl dithiocarbonic acid and salts thereof, O,O'-dialkyl dithiophosphoric acid and salts thereof, and dialkylamino dithioformic acid and salts, said apolar organic solution being the solution in at least one solvent selected from the group consisting of benzene, toluene and straight or branched alkanes having 6-12 carbon atoms and said alkyl having 6-20 carbon atoms; settling for 4-24 hrs and separating out the organic phase; filtrating and distillating the organic phase for concentration; adding at least one selected from the group consisting of methanol, ethanol, acetone and acetonitrile and agitating to separate out a lot of precipitate; and aging, filtrating and cleaning the precipitate to obtain brown copper nanoparticles.

According to the present invention, the aqueous solution containing the reducing agent is first reacted with the aqueous solution containing the copper salt to produce the stable sol of copper nanoparticles. Then the apolar organic solution containing the extracting agent is reacted with the sol to transfer the copper nanoparticles therein into the organic system. At that time, the surfaces of the copper nanoparticles have chemically adsorbed the molecules of the extracting agent and becomes hydrophobic. After the two-phase separation, the organic phase is concentrated and a polar solvent miscible with the organic phase is added to the concentrated organic phase to precipitate the hydrophobic copper nanoparticles. The resultant precipitate is filtrated to obtain the brown solid copper nanoparticles.

According to the present invention, the copper salt is one or more selected from the group consisting of copper sulfate, copper chloride, copper nitrate and copper acetate.

According to the present invention, the aqueous solution containing the copper salt has a molar concentration of 0.02-0.2.

According to the present invention, the aqueous solution containing the reducing agent has a molar concentration from five to twenty times as large as the molar concentration of the aqueous solution containing the copper salt.

According to the present invention, the apolar organic solution containing the extracting agent has a molar concentration which is 0.2-2 times as large as the molar concentration of the aqueous solution containing the copper salt.

The present process has the advantages of raw materials cheap and easily available, simplicity, low cost and high yield. Thus the present process is suitable in mass industrial production. The copper nanoparticles produced according to the present invention have an even particle diameter. In addition, the particle diameter of the copper nanoparticles can be controlled in the range of 1-10 nanometers depending on the process conditions. Furthermore, the copper nanoparticles produced according to the present invention are stable in the air and are miscible with the apolar organic solvents such as benzene and petroleum ether. Particularly, the copper nanoparticles produced according to the present invention can be stably dispersed in many kinds of lubricant base oil and thus can meet the basic requirements of research and application for a novel lubricant additive.

The above advantages are related to the extraction preparation process adopted in the present invention and the selection of a suitable extracting agent. The extraction preparation process according to the present invention consists of a phase transfer process and a precipitate separation process. During the phase transfer process, the nanoparticles surface-modified with the extracting agent and stably dispersed are transfered from the aqueous phase into the organic phase while the particles which cannot be stably dispersed in the organic phase cannot enter the organic phase. In this way, the final product can be stably dispersed in the organic materials. During the precipitate separation process, small organic molecules and undersized particles are removed and thus the resultant product is pure and has an even particle diameter.

BEST MODES FOR CARRYING OUT THIS INVENTION

By the following examples, the present invention can be better understood.

EXAMPLE 1

An aqueous solution of copper acetate (5 mmol/L), an aqueous solution of hydrazine hydrate (50 mmol/L), and a solution of (O,O')-di-n-hexadecyl dithiophosphoric acid in benzene (15 mmol/L, an extracting agent) were prepared respectively. At room temperature, the aqueous solution of copper acetate was quickly added to the aqueous solution of hydrazine hydrate at equal volumes to produce a mixture reaction system. The mixture reaction system was vigorously stirred and reacted. After 1 min, the extracting agent was added to the above reaction system at equal volumes to produce a mixture system. The resultant mixture system was stirred at room temperature for 1 hr and settled for 4 hrs. The organic phase was separated, filtrated and distillated to remove the solvent at 90° C. 200 ml of acetone was added to the distilled organic phase. The resultant system was stirred and a large amount of brown precipitate appeared. The brown precipitate was aged for 24 hrs, filtrated, washed for three times with 100 ml of acetone and dried. Finally a product as brown powder was obtained.

From FIG. 1 which shows a transmitted electron microscopic photographs, it can be seen that the resulting copper nanoparticles have a uniform particle diameter, will not aggeragate, and have an average particle diameter of about 2-4 nm.

EXAMPLE 2

An aqueous solution of copper sulfate (10 mmol/L), an aqueous solution of sodium borohydride (0.1 mol/L), and a solution of octadecyl dithiocarbonic acid in benzene (12 mmol/L, an extracting agent) were prepared respectively. At room temperature, the aqueous solution of copper acetate was quickly added to the aqueous solution of sodium borohydride at equal volumes to produce a mixture reaction system. The mixture reaction system was vigorously stirred and reacted. After 1 min, the extracting agent was added to the above reaction system at equal volumes to produce a mixture system. The resultant mixture system was stirred at room temperature for 1 hr and settled for 4 hrs. The organic phase was separated, filtrated and distillated to remove the solvent at 90° C. 200 ml of acetone was added to the distilled organic phase. The resultant system was stirred and a large amount of brown precipitate appeared. The brown precipitate was aged for 24 hrs, filtrated, washed for three times with 100 ml of acetone and dried. Finally a product as a brown powder was obtained.

Figure 2:
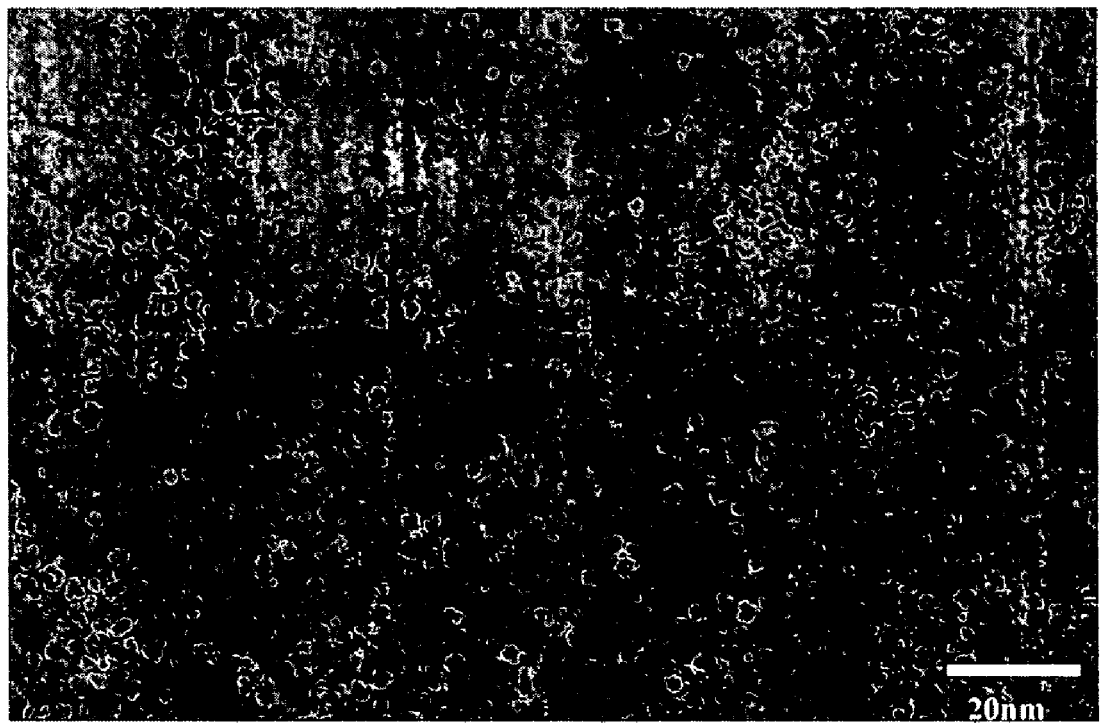
FIG. 2 shows a transmitted electron microscopic photograph of the copper nanoparticle obtained by using octadecyl dithiocarbonic acid as an extracting agent. As can be seen, the particle diameter of the copper nanoparticle is about 3-7 nm.

From FIG. 2 which shows a transmitted electron microscopic photographs of the copper nanoparticles produced in Example 2, it can be seen that the resulting copper nanoparticles have a uniform particle diameter, and will not aggeragate.

EXAMPLE 3

An aqueous solution of copper acetate (1 mmol/L), an aqueous solution of sodium borohydride (5 mmol/L), and a solution of di-n-hexadecyl dithiocarbamic acid in hexane (1 mmol/L, an extracting agent) were prepared respectively. At room temperature, the aqueous solution of copper acetate was quickly added to the aqueous solution of sodium borohydride at equal volumes to produce a mixture reaction system. The mixture reaction system was vigorously stirred and reacted. After 1 min, the extracting agent was added to the above reaction system at equal volumes to produce a mixture system. The resultant mixture system was stirred at room temperature for 1 hr and settled for 4 hrs. The organic phase was separated, filtrated and distillated to remove the solvent at 80° C. 100 ml of acetone was added to the distillated organic phase. The resultant system was stirred and a large amount of brown precipitate appeared. The brown precipitate was aged for 24 hrs, filtrated, washed for three times with 100 ml of acetone and dried. Finally a product as a brown powder was obtained.

EXAMPLE 4

An aqueous solution of copper dichloride (5 mmol/L), an aqueous solution of sodium hypophosphite (50 mmol/L), and a solution of (O,O')-di-n-hexadecyl dithiophosphoric acid in benzene (15 mmol/L, an extracting agent) were prepared respectively. At room temperature, the aqueous solution of copper acetate was quickly added to the aqueous solution of sodium hypophosphite at equal volumes to produce a mixture reaction system. The mixture reaction system was vigorously stirred and reacted. After 1 min, the extracting agent was added to the above reaction system at equal volumes to produce a mixture system. The resultant mixture system was stirred at room temperature for 1 hr and settled for 4 hrs. The organic phase was separated, filtrated and distillated to remove the solvent at 90° C. 200 ml of acetone was added to the distillated organic phase. The resultant system was stirred and a large amount of brown precipitate appeared. The brown precipitate was aged for 24 hrs, filtrated, washed for three times with 100 ml of acetone and dried. Finally a product as a brown powder was obtained.

EXAMPLE 5

An aqueous solution of copper acetate (5 mmol/L), an aqueous solution of hydrazine hydrate (70 mmol/L), and a solution of (O,O')-di-n-hexadecyl dithiophosphoric acid in benzene (4 mmol/L, an extracting agent) were prepared respectively. At room temperature, the aqueous solution of copper acetate was quickly added to the aqueous solution of hydrazine hydrate at equal volumes to produce a mixture reaction system. The mixture reaction system was vigorously stirred and reacted. After 1 min, the extracting agent was added to the above reaction system at equal volumes to produce a mixture system. The resultant mixture system was stirred at room temperature for 1 hr and settled for 4 hrs. The organic phase was separated, filtrated and distillated to remove the solvent at 90° C. 200 ml of acetone was added to the distillated organic phase. The resultant system was stirred and a large amount of brown precipitate appeared. The brown precipitate was aged for 24 hrs, filtrated, washed for three times with 100 ml of acetone and dried. Finally a product as a brown powder was obtained.

We claim:

1. A process for producing copper nanoparticles, comprising steps of:
    a) reacting an aqueous solution containing a reductant with an aqueous solution of a copper salt while stirring for 1-8 min to form an aqueous copper sol, wherein the reductant being one or more selected from the group consisting of hydrazine hydrate, sodium borohydride and sodium hypophosphite;
    b) two-phase-reacting the aqueous copper sol with a water-insoluble apolar organic solution containing an extracting agent while stirring for 0.5-1.5 hrs, said extracting agent being one or more selected from the group consisting of alkyl dithiocarbonic acid and salts thereof, O,O'-dialkyl dithiophosphoric acid and salts thereof, and dialkylamino dithioformic acid and salts and said apolar organic solution being one selected from the group consisting of benzene, toluene and straight or branched alkanes having 6-12 carbon atoms, wherein the alkyl having 6-20 carbon atoms; and
    c) post-treating the reaction product to obtain copper nanoparticles.

2. A process as claimed in claim 1, characterized in that said copper salt is one or more selected from the group consisting of copper sulfate, copper chloride, copper nitrate and copper acetate.

3. A process as claimed in claim 1, characterized in that said aqueous solution containing the copper salt has a molar concentration of 0.02-0.2.

4. A process as claimed in claim 1, characterized in that said aqueous solution containing the reductant has a molar concentration from five to twenty times as large as the molar concentration of the aqueous solution containing the copper salt.

5. A process as claimed in claim 1, characterized in that said apolar organic solution containing the extracting agent has a molar concentration which is 0.2-2 times as large as the molar concentration of the aqueous solution containing the copper salt.

6. A process as claimed in claim 1, wherein the post-treatment step comprising the steps of: settling for 4-24 hrs and separating out the organic phase; filtrating and distillating the organic phase for concentration; adding one selected from the group consisting of methanol, ethanol, acetone and acetonitrile and agitating to separate out a lot of precipitate; and aging, filtrating and cleaning the precipitate to obtain brown copper nanoparticles.

* * * * *